United States Patent
Martens et al.

(10) Patent No.: US 7,688,704 B2
(45) Date of Patent: Mar. 30, 2010

(54) MULTILAYER OPTICAL DISC HAVING DISC INFORMATION

(75) Inventors: Hubert Cécile François Martens, Eindhoven (NL); Pierre Hermanus Woerlee, Eindhoven (NL); Jakob Gerrit Nijboer, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 923 days.

(21) Appl. No.: 10/549,639

(22) PCT Filed: Mar. 9, 2004

(86) PCT No.: PCT/IB2004/050219

§ 371 (c)(1),
(2), (4) Date: Sep. 20, 2005

(87) PCT Pub. No.: WO2004/086380

PCT Pub. Date: Oct. 7, 2004

(65) Prior Publication Data

US 2006/0203701 A1    Sep. 14, 2006

(30) Foreign Application Priority Data

Mar. 24, 2003    (EP)    .................................. 03100754

(51) Int. Cl.
*G11B 7/24* (2006.01)
*G11B 7/00* (2006.01)

(52) U.S. Cl. .............. 369/275.3; 369/275.1; 369/275.2; 369/275.4; 369/100

(58) Field of Classification Search ............... 369/275.3, 369/13.02, 13.03, 13.38, 13.39, 30.01, 30.03, 369/44.13, 111, 279
See application file for complete search history.

(56) References Cited

U.S. PATENT DOCUMENTS

| | | | |
|---|---|---|---|
| 4,901,300 A | | 2/1990 | Van Der Zande et al. |
| 5,187,699 A | | 2/1993 | Raaymakers et al. |
| 6,072,759 A | * | 6/2000 | Maeda et al. ............ 369/59.25 |
| 6,404,713 B1 | * | 6/2002 | Ueki ....................... 369/47.53 |
| 6,540,397 B2 | * | 4/2003 | Yoshinari et al. ............ 368/286 |
| 7,184,377 B2 | * | 2/2007 | Ito et al. .................. 369/47.14 |

(Continued)

FOREIGN PATENT DOCUMENTS

EP    1126446 A2    8/2001

(Continued)

*Primary Examiner*—Hoa T Nguyen
*Assistant Examiner*—Andrew J Sasinowski

(57) ABSTRACT

A multi-layer record carrier is for recording information by writing marks in a track. The record carrier has a first recording layer (40) and a second recording layer (41), and each recording layer has a pregroove (14) indicating the position of the track according to an opposite track path. The pregroove exhibits a modulated wobble for representing control information. A lead-in part of the pregroove has first control information for the first recording layer, and the lead-out part on the second recording layer has second control information including recording parameters for the second recording layer. The device the device has a head (22) for providing the beam and wobble detection means (32) for retrieving control information from each layer.

12 Claims, 6 Drawing Sheets

U.S. PATENT DOCUMENTS

Figure 2:
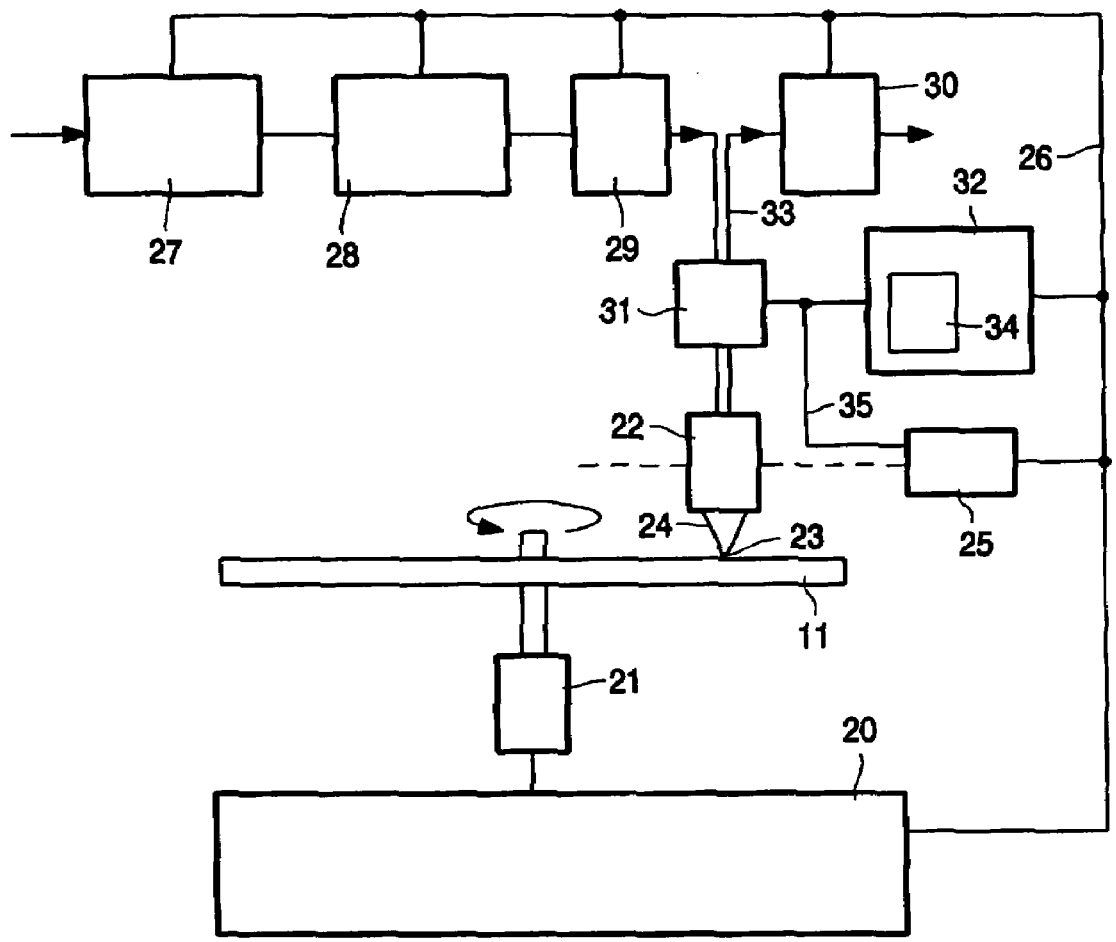

| | | |
|---|---|---|
| 7,385,892 B2 * | 6/2008 | Sasaki et al. .............. 369/47.51 |
| 2001/0033543 A1 | 10/2001 | Akiyama et al. |
| 2002/0186637 A1 | 12/2002 | Van Woudenberg et al. |
| 2003/0002420 A1 * | 1/2003 | Yoon et al. ................ 369/59.25 |
| 2003/0031098 A1 | 2/2003 | Shoji et al. |
| 2003/0081535 A1 * | 5/2003 | Ross ........................ 369/275.3 |

FOREIGN PATENT DOCUMENTS

| | | |
|---|---|---|
| WO | 0043996 | 7/2000 |
| WO | 03100702 A2 | 12/2003 |
| WO | 03102937 A1 | 12/2003 |
| WO | 2004003899 A1 | 1/2004 |
| WO | 2004086380 A1 | 10/2004 |

* cited by examiner

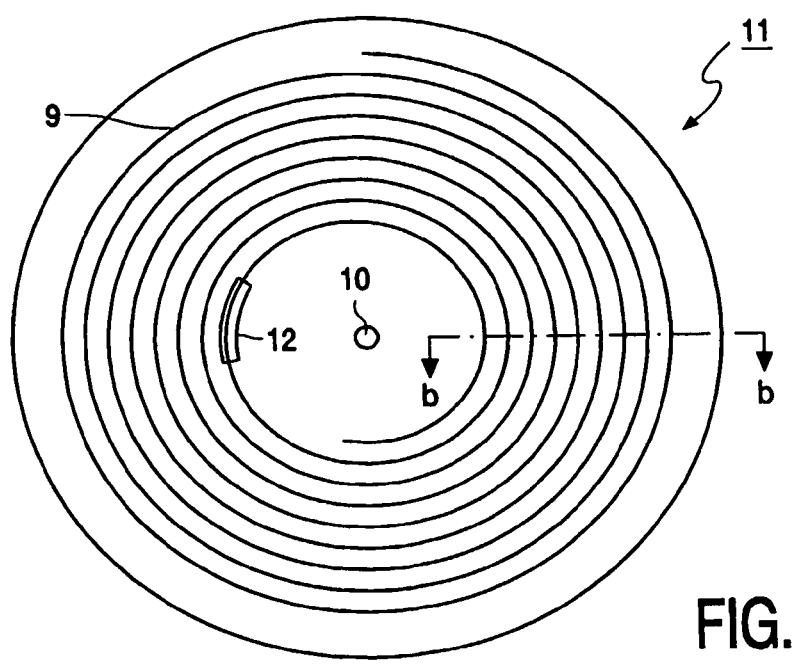
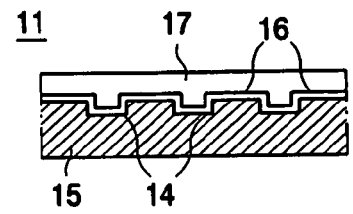
FIG. 1b
FIG. 1a
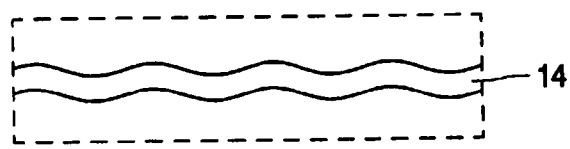
FIG. 1c

MULTILAYER OPTICAL DISC HAVING DISC INFORMATION

The invention relates to a record carrier of a writable type for recording information by writing marks in a track.

The invention further relates to a device for scanning the record carrier.

An optical record carrier and scanning device are known from WO00/43996. The record carrier comprises a guide groove, usually called pregroove, for indicating the position of tracks in which the information is to be represented in a predefined manner by recording optically readable marks. The pregroove is meandering by a periodic excursion of the track in a direction transverse to the longitudinal scanning direction (further denoted as wobble). The wobble comprises a wobble modulation, for example by inversing wobble periods in phase according to additional information such as physical addresses or recording control information. A scanning device is provided with a head for generating a beam of radiation for scanning the track. The marks are detected during said scanning by variations of the reflectivity of the scanned surface. The variations in intensity of the reflected radiation are detected by a main detector system. Furthermore the scanning device has auxiliary detectors for generating tracking servo signals based on the pregroove for detecting a spatial deviation of the head with respect to the track. The tracking servo signals are used to control actuators to position the head on the track. The wobble modulation is detected via the auxiliary detectors and demodulated for retrieving the physical address information. The wobble modulation is also used to encode recording control information for controlling parameters of the recording process, for example in DVD+RW (Digital Versatile Disc ReWritable) recording parameters like laser write power values at specific recording speeds are encoded in a lead-in part of the pregroove. However the data capacity of the wobble modulation is limited and the amount of recording control information that is necessary for current and future high density and complicated recording processes is increasing, in particular for multilayer record carriers.

Therefore it is an object of the invention to provide a record carrier and a scanning device for accommodating additional control information.

According to a first aspect of the invention the object is achieved with a record carrier of a writable type for recording information by writing marks in a track on a recording layer via a beam of radiation entering through an entrance face of the record carrier, the marks being detectable during scanning the track via the beam, the record carrier comprising at least a first recording layer and a second recording layer, the first recording layer being present at a position closer to the entrance face than the second recording layer, and a transparent spacer layer between the recording layers, each recording layer comprising a pregroove indicating the position of the track, the pregroove exhibiting a wobble constituted by displacements of the pregroove in a direction transverse to the longitudinal direction of the track, the wobble exhibiting a wobble modulation for representing control information, and the pregroove on the first recording layer extending spirally in a first direction and the pregroove on the second recording layer extending spirally in a second direction opposite to the first direction for constituting a two part recording area interrupted by an intermediate zone that physically is constituted by a first intermediate part located at the end of the first recording layer and a second intermediate part located at the start of the second recording layer, the recording area being preceded by lead-in information located at the start of the first recording layer and being followed by an ending part for lead-out information or further intermediate information located at the end of the second recording layer, a lead-in part of the pregroove located at a part of the first recording layer intended for recording the lead-in information comprising said wobble modulation representing first control information including recording parameters for the first recording layer, and the ending part comprising said wobble modulation representing second control information including recording parameters for the second recording layer.

According to a second aspect of the invention the object is achieved with a device for scanning a track on the above mentioned record carrier via a beam of radiation, the device comprising a head for providing the beam, recording means for writing marks in the track via the beam, a front-end unit for generating a scanning signal for detecting marks in the track, and wobble detection means for retrieving the first control information from the wobble modulation on the first recording layer and for locating the ending part and retrieving the second control information from the wobble modulation on the second recording layer.

The effect of the measures is that control information for each layer is accommodated on the respective layer and hence the data capacity available for each layer is similar and does not need to be shared when the number of layers increases. This has the advantage that a large number of recording parameters can be stored for each layer.

The invention is also based on the following recognition. Modern high density recording processes require a large number of parameters to be specified and adjusted for a record carrier of a specific brand. Traditionally such control information is located in the lead-in part of the pregroove. The recording device first reads the lead-in part and retrieves the control information. The inventors have seen that the available data capacity in the lead-in part is limited, in particular in multilayer record carriers that are defined to have a single logical recording space constituted by a number of physical recording areas on different layers. Each layer has one physical recording area, the first layer starting with a lead-in part and the final layer ending with a lead-out part, and the recording space being physically interrupted by intermediate zones. The track on consecutive layers has an opposite track path (OTP), e.g. the spiral direction is outward on the first layer and inward on the next in order to enable a continuous scanning of the track from layer to layer without a large radial jump of the head. In such an OTP record carrier there is only one lead-in area. The inventors have located the recording control information for the first layer only in the lead-in part, and recording control information for the further layer(s) in the lead-out part of the second layer (or in general the ending parts of the further layers radially corresponding to the lead-in part of the first layer for a record carrier having more than two layers).

In an embodiment of the record carrier the lead-in part of the pregroove is extending on the first recording layer from a starting radial position to an ending radial position, and the area of the ending part of the pregroove that comprises the second control information is substantially located between a radial position corresponding to said ending radial position and a radial position corresponding to said starting radial position. This has the advantage that after retrieving the first control information a device can easily switch to the second layer and retrieve the second control information without a substantial radial jump. In particular no radial jump in needed when said ending radial position on the first recording layer substantially corresponds to a radial position on the second recording layer where the wobble modulation representing the second control information starts.

In an embodiment the device comprises a control unit for performing a initialize procedure after inserting the record carrier, in which procedure the first control information is recorded in the lead-in part and the second control information layer is recorded in the ending part. This has the advantage that time needed for the startup is significantly shortened when the record carrier is again inserted in a device, because the wobble modulation has a very low data capacity compared to data written by the marks, usually called high frequency (HF) data.

Further preferred embodiments of the device according to the invention are given in the further claims.

Figure 3:
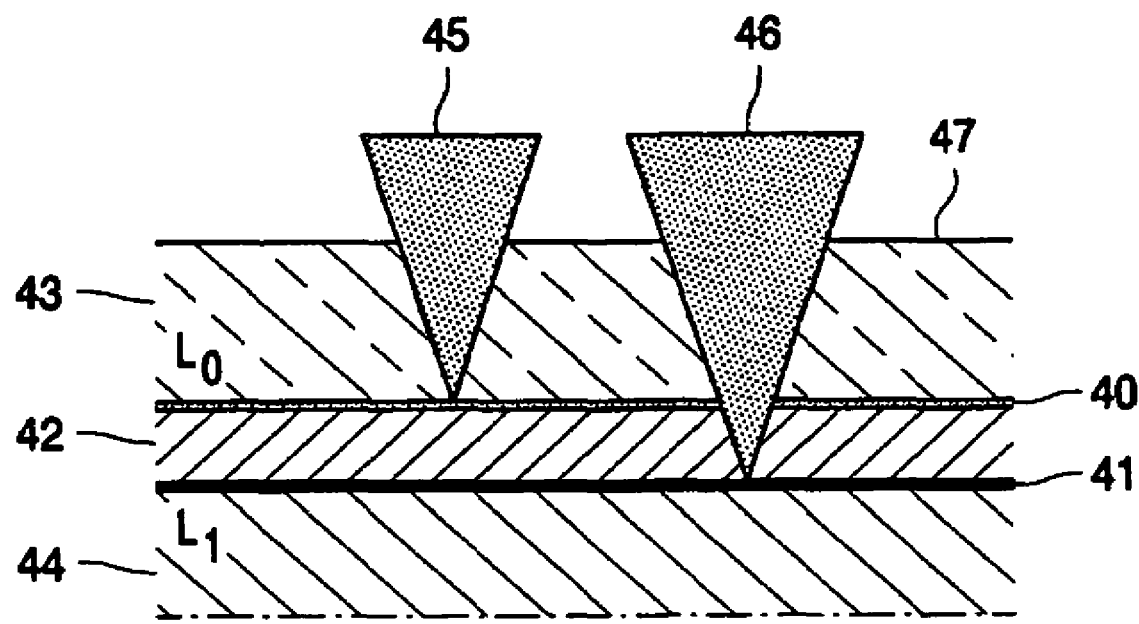
Figure 4:
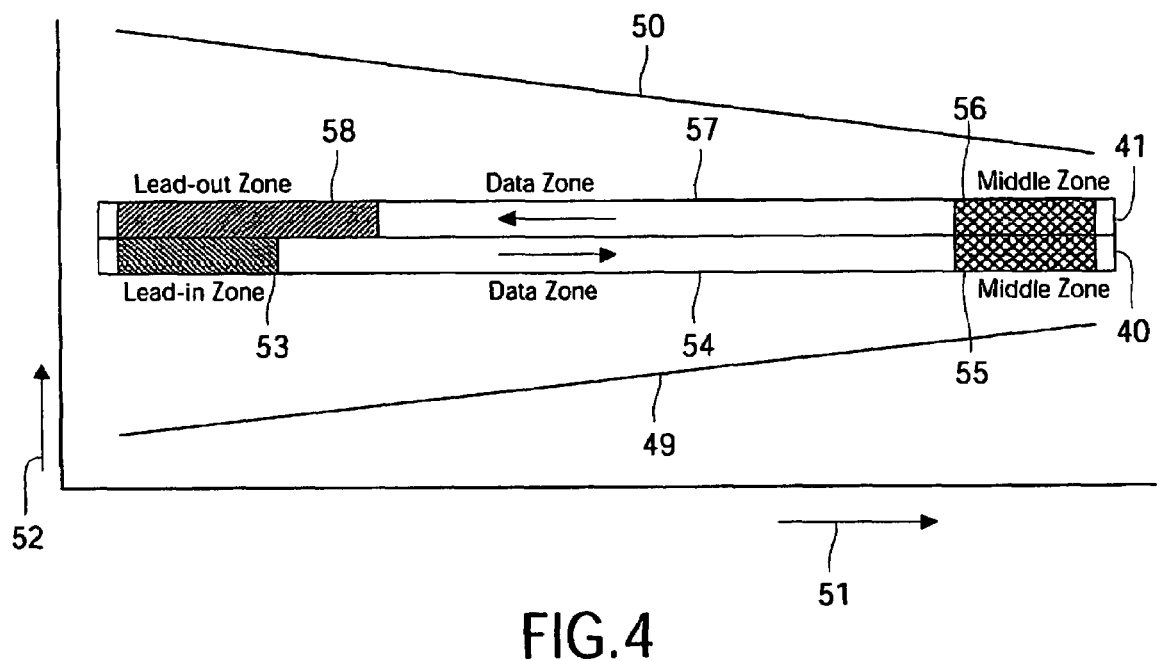
Figure 5:
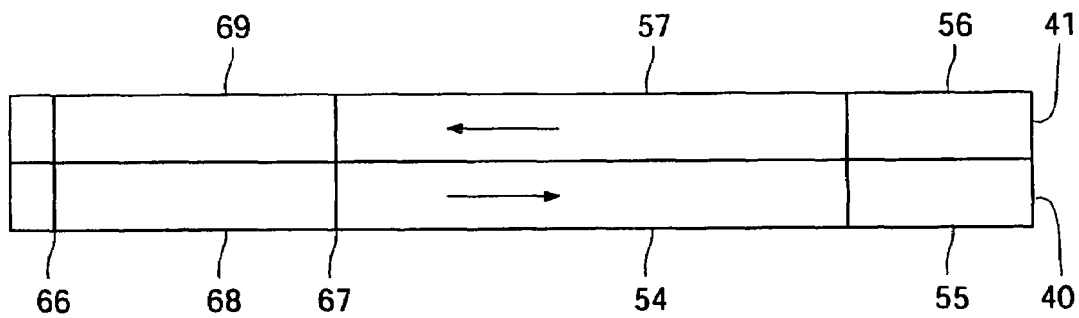
Figure 6:
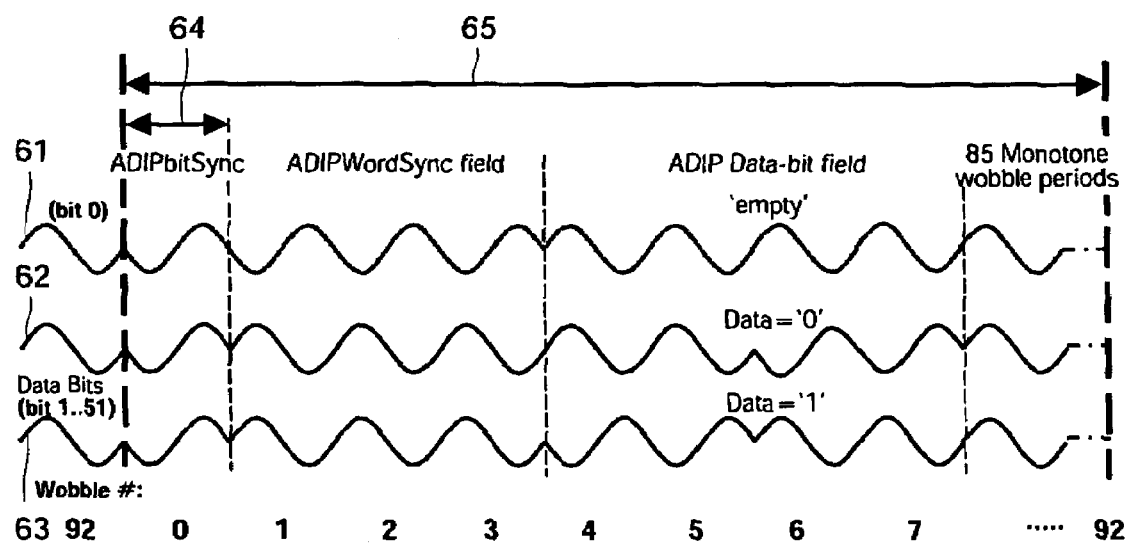
Figure 7:
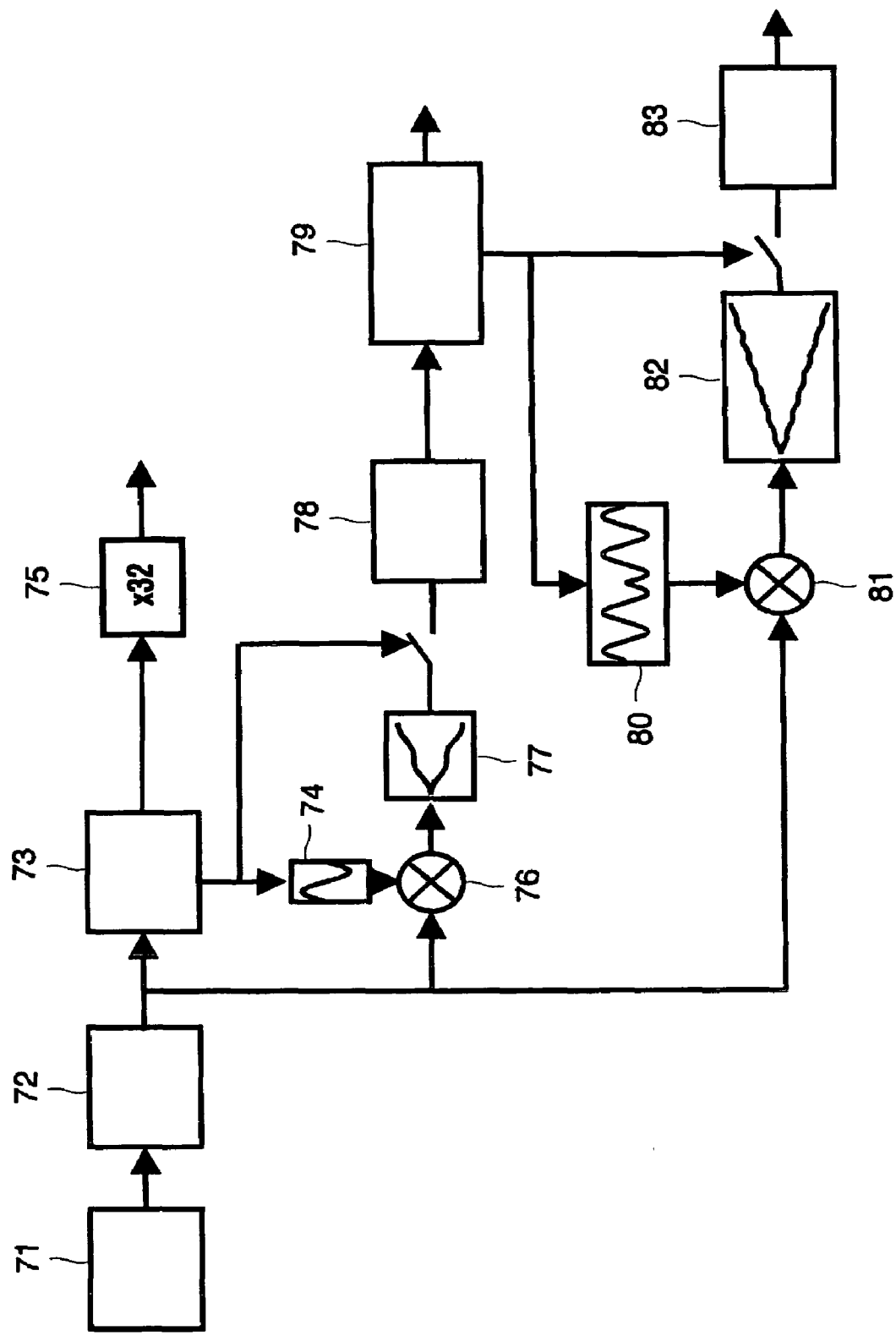

These and other aspects of the invention will be apparent from and elucidated further with reference to the embodiments described by way of example in the following description and with reference to the accompanying drawings, in which FIG. 1a shows a disc-shaped record carrier (top view), FIG. 1b shows a cross-section taken of the record carrier, FIG. 1c shows an example of a wobble of the track, FIG. 2 shows a scanning device for retrieving recording control information from different layers of a record carrier, FIG. 3 shows a multilayer optical disc, FIG. 4 shows schematically an opposite track path record carrier, FIG. 5 shows schematically an opposite track path record carrier having corresponding radial positions for lead-in part and lead-out part, FIG. 6 shows ADIP information in wobble modulation, and FIG. 7 shows a wobble demodulation unit.

In the Figures, elements which correspond to elements already described have the same reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. Examples of a recordable disc are the CD-R and CD-RW, and the DVD+RW. The track 9 on the recordable type of record carrier is indicated by a pre-embossed track structure provided during manufacture of the blank record carrier, for example a pregroove. Recorded information is represented on the information layer by optically detectable marks recorded along the track. The marks are constituted by variations of a first physical parameter and thereby have different optical properties than their surroundings. The marks are detectable by variations in the reflected beam, e.g. variations in reflection.

FIG. 1b is a cross-section taken along the line b-b of the record carrier 11 of the recordable type, in which a transparent substrate 15 is provided with a recording layer 16 and a protective layer 17. The track structure is constituted, for example, by a pregroove 14 which enables a read/write head to follow the track 9 during scanning. The pregroove 14 may be implemented as an indentation or an elevation, or may consist of a material having a different optical property than the material of the pregroove. The pregroove enables a read/write head to follow the track 9 during scanning. A track structure may also be formed by regularly spread sub-tracks which periodically cause servo signals to occur. The record carrier may be intended to carry real-time information, for example video or audio information, or other information, such as computer data.

FIG. 1c shows an example of a wobble of the track. The Figure shows a periodic variation of the lateral position of the track, also called wobble. The variations cause an additional signal to arise in auxiliary detectors, e.g. in the push-pull channel generated by partial detectors in the central spot in a head of a scanning device. The wobble is, for example, frequency modulated and position information is encoded in the modulation. A comprehensive description of the prior art wobble as shown in FIG. 1c in a writable CD system comprising disc information encoded in such a manner can be found in U.S. Pat. No. 4,901,300 (PHN 12.398) and U.S. Pat. No. 5,187,699 (PHQ 88.002).

During readout by scanning the wobble modulation is detectable via a second type of variations of the radiation, such as variation of intensity in the cross section of the reflected beam detectable by detector segments or additional detectors for generating tracking servo signals. Detecting the wobble for a tracking servo system is well known from the above mentioned CD-R and CD-RW system. The wobble modulation is used to encode physical addresses, for example as shown in FIG. 6, while wobble demodulation is shown in FIG. 7.

User data can be recorded on the record carrier by marks having discrete lengths in unit called channel bits, for example according to the CD or DVD channel coding scheme. The marks are having lengths corresponding to an integer number of channel bit lengths T. The shortest marks that are used have a length of a predefined minimum number d of channel bit lengths T for being detectable via the scanning spot on the track that has an effective diameter, usually being roughly equal to the length of the shortest mark.

According to the invention the record carrier is a multilayer record carrier having a wobble modulation on each layer for encoding recording control information as discussed in detail with reference to FIGS. 3 and 4. The wobble modulation encoding the recording control information is schematically indicated by area 12 in FIG. 1a. It is to be noted that in practical circumstances the recording control information will be encoded using a multitude of windings of the track, i.e. the area being encoded constituting an annular shaped area from a starting to an ending radial position. In an embodiment the recording control information is recorded repeatedly, i.e. the area having the wobble modulation contains a multitude of copies of the recording control parameters.

FIG. 2 shows a scanning device for retrieving recording control information from different layers of a record carrier. The device is provided with means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The error signals 35 are also coupled to a wobble demodulation unit 32 for retrieving the physical addresses and other control information from the wobble modulation. A detailed embodiment of wobble modulation detection is given in FIG. 7. The main scanning signal 33 is processed by read processing unit 30 of a usual type including a demodulator, deformatter and output unit to retrieve the information.

The device is provided with recording means for recording information on a record carrier of a writable or re-writable type, for example CD-R or CD-RW, or DVD+RW or BD. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the beam of radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 controls the scanning and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. In an embodiment the control unit performs the functions of retrieving the control information from the pregroove and recording the retrieved control information in the track by writing marks like main data. Such data can be retrieved much faster than pregroove encoded control information. Several advantageous options are given below.

FIG. 3 shows a multilayer optical disc. L0 is a first recording layer 40 and L1 is a second recording layer 41. A first transparent layer 43 covers the first recording layer, a transparent spacer layer 42 separates both recording layers 40,41 and a substrate layer 44 is shown below the second recording layer 41. The first recording layer 40 is located at a position closer to an entrance face 47 of the record carrier than the second recording layer 41. A laser beam is shown in a first state 45 focused on the L0 layer and the laser beam is shown in a second state 46 focused at the L1 layer. Each recording layer has the wobble modulation of the pregroove that encodes auxiliary control information.

Multilayer discs are already available as read-only pre-recorded discs, such as DVD-ROM or DVD-Video. A dual layer DVD+R disc has recently been suggested, which disc should preferably be compatible with the dual layer DVD-ROM standard. The reflection levels of both layers are >18%. The L0 layer has a transmission around 50-70%. A spacer layer separates the layers with a typical thickness between 30 and 60 µm. The L1 layer has a high reflection and needs to be very sensitive. Also rewritable dual-layer discs are proposed. The L0 layer has a transmission around 40-60%. The effective reflection of both layers is typically 7% although lower and higher values are possible (3%-18%). Writable and rewritable optical storage media having 3 or more recording layers are considered also.

The two information-storage layers that are present in a dual-layer disc will, in general, have different physical characteristics. An obvious difference between the two layers is the reflection and transmission. In order to be able to access the deeper layer L1, the upper layer L0 should be sufficiently transparent at the laser wavelength. Also, to obtain sufficient read-out signals from the deeper layer L1, this layer should be highly reflecting at the laser wavelength. Other physical differences can be stack structure (inverted or conventional), groove depth, stack design, etc. A consequence of the different physical properties of L0 and L1 is that important parameters that should be known to the drive—e.g. write-strategy (type or parameters), indicative write power, target β, etc—will, in general, be different for the two layers. The parameters need to be known to a drive to ensure proper recording performance, disc handling, etc. Therefore, such 'disc info' is physically stored on the (un-recorded) disc. Known methods to store such data for single layer discs are modulation of wobble, pre-pits, chip-in-disc, etc. Commonly for single-layer discs the disc info is located somewhere in the lead-in zone of the disc. The reason for this is that drives accesses a disc near the inner radius, i.e. in the lead-in zone: the disc info can be read immediately, thereby minimizing delay in start-up procedures. Due to the required compatibility with existing read-only standardized record carriers, like the DVD-ROM standard, for a DVD-type dual-layer recordable (or rewritable) disc there are two options possible for the layout of the disc. These two options are referred to as 'parallel track path' (PTP) and 'opposite track path' (OTP), which indicates the direction of the spiral in both layers. In PTP discs there is one information zone per layer (two in total), while in OTP discs there is only one information zone extending over the two layers.

FIG. 4 shows schematically an opposite track path record carrier. Horizontally arrow 51 indicates the radial position (increasing outward) and vertically arrow 52 indicates the physical addresses, i.e. sector numbers. Curve 49 indicates the increasing addresses on the L0 layer 40 going outward, while curve 50 indicates the addresses on the L1 layer 41 further increasing going inward. The recording zone have a first data zone 54 on L0 and a second part 57 on L1, interrupted by a middle zone constituted by a first intermediate part 55 at the end of the recording L0 layer 40 and a second intermediate part 56 at the beginning (in track direction) of the L1 recording layer 41. The arrows in the data zones 54,57 indicate the spiral direction. The recording zone is preceded by a lead-in zone 53 at the beginning of the L0 recording layer and concluded by a lead-out zone 58 at the end of the L1 recording layer. It is noted that a multilayer disc having more than two layers may have a third intermediate area at the end of the second recording layer and a fourth intermediate area at the beginning of the third recording layer, and so on. The lead-out zone concludes the last recording layer. The respective intermediate part or lead-out part of each further layer radially corresponding to the lead-in zone on the first recording layer is called ending part. According to the invention recording control information for each layer is encoded in the pregroove wobble in the ending part of that respective layer.

In the further text "lead-out" of a dual layer disc is used for explaining the invention, which is deemed to include the ending part in the event of discs having more than two layers.

For the dual-layer disc one logical information zone is present and therefore only one lead-in zone is present which is located on L0. The storage capacity of this lead-in zone is (nearly) the same as for a single-layer disc. However at least twice as much disc information must be stored. Thereto the lead-out zone of the information zone on the dual layer record carrier is used. The capacity available in this lead-out zone enables storing the disc info for L1 (disc info for L0 can remain in the lead-in zone on L0). Note that for single-layer discs, the lead-out zone is located at the outer perimeter of the recording layer and contains no disc info.

FIG. 5 shows schematically an opposite track path record carrier having corresponding radial positions for lead-in part and lead-out part. The lead-in part 68 of the pregroove is extending on the L0 recording layer 40 from a starting radial position 66 to an ending radial position 67, and the area of the lead-out that comprises the control information for the second layer is located between a radial position corresponding to the ending radial position 67 and a radial position corresponding to the starting radial position 66. It is noted that the lead-out part used for encoding the second recording control information may be smaller than or equal to the lead-in part. In particular said ending radial position 67 on the first recording layer substantially corresponds to a radial position on the second recording layer where the wobble modulation representing the second control information starts. Hence, after a layer jump at the end of reading the lead-in part, the beam is immediately closely positioned to the start of the encoded recording control in formation of the L1 recording layer 41. Therefore this solution does not lead to additional delay during start up. Finally, it should be noted that the spiral direction on L1 for an OTP disc is from the outside to the inside. This means that on L1 the disc info (and in general any data) start at a larger radius and spiral towards a smaller radius. This is opposite from the situation on L0, where the data start at a smaller radius and spiral in the direction of larger radius.

In the recording device the control unit is arranged for retrieving the control information from the respective recording layers of the record carrier. In an embodiment initialization of the record carrier is performed by copying the disc control information to control data by writing the marks in the track, usually called high frequency (HF) data. The control information is encoded using wobble modulation, for example ADIP as explained with FIG. 6. Due to the low bit density available in ADIP, reading the disc info from ADIP is quite time-consuming. For this reason, recordable/rewritable DVD discs are initialized: the disc info is copied by the drive as 'control data' in the control data zone, which is located in the lead-in zone. Due to the high bit-density of the HF signal compared to the ADIP bit-density, this speeds up gathering of disc info when the disc is inserted in the drive another time.

Moreover, due to the high bit-density of the HF signal, it is possible to copy control data multiple (>1) times within the control data zone. This also has the advantage of speeding up start-up procedures and reduces the chance for errors during read-back of control data. For the case of dual-layer recordable/rewritable DVD media optional initialization procedures are as follows.

In an embodiment the disc info available in ADIP of the lead-in on L0 is copied by the drive as control data in the lead-in of L0 and the disc info available in ADIP of lead-out on L1 is copied by the drive as control data in the lead-out of L1. This procedure should be performed the first time that a disc is inserted in a drive. Note that it implies that (part of) the lead-out on L1 is to be recorded even if the disc is not yet full.

In an embodiment the disc info available from L0 and L1 is copied on both layers. This is possible due to the higher storage density available in the HF compared to the ADIP. Disc info available from ADIP in L0 plus disc info available from ADIP in L1 is copied into control data on L0. In addition or alternatively disc info available from ADIP in L0 plus disc info available from ADIP in L1 is copied into control data on L1. This latter solution has the advantage that, regardless of the layer (0 or 1) that is captured during access, the drive immediately can read the control data for both L0 and L1.

FIG. 6 shows ADIP information in wobble modulation. The wobble modulation encodes additional information that is called Address In Pregroove (ADIP) in the DVD+RW system. Each ADIP bit 65 is constituted by ADIP bit sync (one wobble period 64 corresponding to 32 channel bits), followed by a ADIP word sync field (3 wobble periods) and the ADIP Data-bit field of 4 wobble periods, followed finally by 85 monotone (i.e. not modulated) wobble periods. The Figure shows a first wobble 61 which is encoded as an ADIP word sync, in which the word sync field has inverted wobbles and the data-bit field has non modulated wobbles. Second wobble 62 encode a data bit value 0 and third wobble 63 encodes a data bit of value 1.

FIG. 7 shows a wobble demodulation unit. The input unit 71 provides a push-pull signal derived from the head scanning the track. A filter 72 filters the signal by high pass and low pass filters for isolating the wobble frequency and generating a wobble signal. A phase locked loop 73 is locked to the wobble frequency, and generates via a 32× multiplier 75 the synchronous write clock for recording marks in units of channel bits. A synchronous wobble unit 74 provides a wobble clock period to multiplier 76 which also receives the wobble signal. The output of the multiplier 76 is integrated in integrate and dump unit 77, of which the output is samples via a sample switch to a sync threshold detector 78 coupled to a ADIP bit synchronizer that detects the ADIP bit syncs. A second multiplier 81 is provided with a 4 wobble period signal having two inverted and two non inverted wobbles and the wobble signal on a second input for synchronous detection over 4 wobble periods. A second integrate and dump unit 82 integrates output signal of the multiplier 82, while a bit value threshold detector 83 for detecting the values of the encoded bits.

Although the invention has been mainly explained by embodiments using optical discs based on change of reflection, the invention is also suitable for other record carriers such as rectangular optical cards, magneto-optical discs or any other type of information storage system that has a preapplied pattern on a writable record carrier. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Record carrier of a writable type for recording information by writing marks in a track on a recording layer via a beam of radiation entering through an entrance face of the record carrier, the marks being detectable during scanning the track via the beam, the record carrier comprising at least a first recording layer (40) and a second recording layer (41), the first recording layer being present at a position closer to the entrance face (47) than the second recording layer, and a transparent spacer layer (42) between the recording layers, each recording layer comprising a pregroove (14) indicating the position of the track, the pregroove exhibiting a wobble constituted by displacements of the pregroove in a direction transverse to the longitudinal direction of the track, the wobble exhibiting a wobble modulation for representing control information, and the pregroove on the first recording layer (40) extending spirally in a first direction and the pregroove on the second recording layer (41) extending spirally in a second direction opposite to the first direction for constituting a multi-part recording area (54,57) interrupted by an intermediate zone that physically is constituted by a first intermediate part (55) located at the end of the first recording layer and a second intermediate part (56) located at the start of the second recording layer, the recording area being preceded by lead-in information (53) located at the start of the first recording layer and being followed by an ending part for lead-out information (58) or further intermediate information located at the end of the second recording layer, a lead-in part of the pregroove located at a part of the first recording layer intended for recording the lead-in information comprising said wobble modulation representing first control information including recording parameters for the first recording layer, and the ending part comprising said wobble modulation representing second control information including recording parameters for the second recording layer, wherein the recording parameters for the first recording layer are different from the recording parameters for the second recording layer.

2. Record carrier as claimed in claim 1, wherein the lead-in part (68) of the pregroove is extending on the first recording layer from a starting radial position (66) to an ending radial position (67), and the ending part (69) of the pregroove that comprises the second control information is substantially located between a radial position corresponding to said ending radial position (67) and a radial position corresponding to said starting radial position (66).

3. Record carrier as claimed in claim 2, wherein said ending radial position (67) on the first recording layer substantially corresponds to a radial position on the second recording layer where the wobble modulation representing the second control information starts.

4. Device for scanning a track on a record carrier (11) via a beam of radiation (24), the track comprising marks on a recordable area of a recording layer, the beam entering through an entrance face of the record carrier, the record carrier comprising at least a first recording layer (40) and a second recording layer (41), the first recording layer being present at a position closer to the entrance face than the second recording layer, and a transparent spacer layer (42) between the recording layers, and each recording layer comprising a pregroove indicating the position of the track, the pregroove exhibiting a wobble constituted by displacements of the pregroove in a direction transverse to the longitudinal direction of the track, the wobble exhibiting a wobble modulation for representing control information, and the pregroove on the first recording layer extending spirally in a first direction and the pregroove on the second recording layer extending spirally in a second direction opposite to the first direction for constituting a two part recording area interrupted by an intermediate zone that physically is constituted by a first intermediate part located at the end of the first recording layer and a second intermediate part located at the start of the second recording layer, the recording area being preceded by lead-in information located at the start of the first recording layer and being followed by an ending part for lead-out information or further intermediate information located at the end of the second recording layer, a lead-in part of the pregroove located at a part of the first recording layer intended for recording the lead-in information comprising said wobble modulation representing first control information including recording parameters for the first recording layer, and the ending part comprising said wobble modulation representing second control information including recording parameters for the second recording layer, wherein the recording parameters for the first recording layer are different from the recording parameters for the second recording layer, the device comprising a head (22) for providing the beam, recording means (27,28,29) for writing marks in the track via the beam, a front-end unit (31) for generating a scanning signal (33) for detecting marks in the track, and wobble detection means (32) for retrieving the first control information from the wobble modulation on the first recording layer and for locating the ending part and retrieving the second control information from the wobble modulation on the second recording layer.

5. Device as claimed in claim 4, wherein the device comprises a control unit (20) for performing an initialize procedure after inserting the record carrier, in which procedure the first control information is recorded in the lead-in part and the second control information layer is recorded in the ending part.

6. Device as claimed in claim 4, wherein the device comprises a control unit (20) for performing an initialize procedure after inserting the record carrier, in which procedure the first control information and the second control information are recorded in the lead-in part.

7. Device as claimed in claim 4, wherein the device comprises a control unit (20) for performing an initialize procedure after inserting the record carrier, in which procedure the first control information is recorded in the lead-in part and the second control information is recorded in the lead-in part and also in the ending part.

8. Device as claimed in claim 4, wherein the device comprises a control unit (20) for performing an initialize procedure after inserting the record carrier, in which procedure the first control information is recorded in the lead-in part and also in the ending part and the second control information is recorded in the lead-in part and also in the ending part.

9. A record carrier of a writable type for recording information by writing marks in a track on a recording layer via a beam of radiation entering through an entrance face of the record carrier, the marks being detectable during scanning the track via the beam, the record carrier comprising:

at least a first recording layer and a second recording layer, the first recording layer being present at a position closer to the entrance face than the second recording layer, and a transparent spacer layer between the recording layers, each recording layer having a pregroove indicating the position of the track, the pregroove exhibiting a wobble constituted by displacements of the pregroove in a direction transverse to the longitudinal direction of the track, the wobble exhibiting a wobble modulation for representing control information, and the pregroove on the first recording layer extending spirally in a first direction and the pregroove on the second recording layer extending spirally in a second direction opposite to the first direction for constituting a multi-part recording area interrupted by an intermediate zone that physically is constituted by a first intermediate part located at the end of the first recording layer and a second intermediate part located at the start of the second recording layer, the recording area being preceded by lead-in information located at the start of the first recording layer and being followed by an ending part for lead-out information or further intermediate information located at the end of the second recording layer, a lead-in part of the pregroove located at a part of the first recording layer intended for recording the lead-in information comprising said wobble modulation representing first control information including recording parameters for the first recording layer, and the ending part comprising said wobble modulation representing second control information including recording parameters for the second recording layer, wherein the recording parameters for the first recording layer are at least partially independent from the recording parameters for the second recording layer.

10. The record carrier of claim 9 wherein the independence of the recording parameters of the first and second layers includes that the recording parameters are independently determined.

11. A device for scanning a track on a record carrier via a beam of radiation, the track comprising marks on a recordable area of a recording layer, the beam entering through an entrance face of the record carrier, the record carrier comprising at least a first recording layer and a second recording layer, the first recording layer being present at a position closer to the entrance face than the second recording layer, and a transparent spacer layer between the recording layers, and each recording layer comprising a pregroove indicating the position of the track, the pregroove exhibiting a wobble constituted by displacements of the pregroove in a direction transverse to the longitudinal direction of the track, the wobble exhibiting a wobble modulation for representing control information, and the pregroove on the first recording layer extending spirally in a first direction and the pregroove on the second recording layer extending spirally in a second direction opposite to the first direction for constituting a two part recording area interrupted by an intermediate zone that physically is constituted by a first intermediate part located at the end of the first recording layer and a second intermediate part located at the start of the second recording layer, the recording area being preceded by lead-in information located at the start of the first recording layer and being followed by an ending part for lead-out information or further intermediate information located at the end of the second recording layer, a lead-in part of the pregroove located at a part of the first recording layer intended for recording the lead-in information comprising said wobble modulation representing first control information including recording parameters for the first recording layer, and the ending part comprising said wobble modulation representing second control information including recording parameters for the second recording layer, wherein the recording parameters for the first recording layer are stored independently from the recording parameters for the second recording layer, the device comprising a head for providing the beam, recording means for writing marks in the track via the beam, a front-end unit for generating a scanning signal for detecting marks in the track, and wobble detection means for retrieving the first control information from the wobble modulation on the first recording layer and for locating the ending part and retrieving the second control information from the wobble modulation on the second recording layer.

12. The record carrier of claim 11 wherein the independence of the recording parameters of the first and second layers includes that the recording parameters are independently determined.

* * * * *